US007171925B2

(12) United States Patent
Beil et al.

(10) Patent No.: US 7,171,925 B2
(45) Date of Patent: Feb. 6, 2007

(54) METHOD FOR REVERSING THE DIRECTION OF ROTATION OF A TWO-STROKE ENGINE

(75) Inventors: Reinhard Beil, Schwalbach (DE); Thomas Herm, Hohenstein (DE); Frank Kutzner, Altenstadt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/500,674

(22) PCT Filed: Jan. 8, 2003

(86) PCT No.: PCT/DE03/00025

§ 371 (c)(1),
(2), (4) Date: Mar. 21, 2005

(87) PCT Pub. No.: WO03/060300

PCT Pub. Date: Jul. 24, 2003

(65) Prior Publication Data

US 2005/0178347 A1 Aug. 18, 2005

(30) Foreign Application Priority Data

Jan. 16, 2002 (DE) ................................ 102 01 430

(51) Int. Cl.
*F01L 13/02* (2006.01)
*G01M 15/00* (2006.01)

(52) U.S. Cl. ....................................... 123/41 E; 73/116

(58) Field of Classification Search .............. 123/41 E, 123/406.58, 617; 73/116; 324/165
See application file for complete search history.

(56) References Cited

U.S. PATENT DOCUMENTS 4,553,426 A * 11/1985 Capurka ...................... 73/116
6,034,525 A 3/2000 Ng et al.
6,039,010 A 3/2000 Hata
6,098,574 A * 8/2000 Arakawa et al. .......... 123/41 E (Continued)

FOREIGN PATENT DOCUMENTS

DE 35 34 297 A1 4/1987

(Continued)

OTHER PUBLICATIONS

Patent Abstracts of Japan, Publication No. 63124863, Publication Date May 25, 1988, Komatsu Zenoa KK.

(Continued)

*Primary Examiner*—Noah P. Kamen
(74) *Attorney, Agent, or Firm*—Martin A. Farber

(57) ABSTRACT

A method for reversing the direction of rotation of a two-stroke engine whose rotational speed and crank mechanism position are sensed by a sensor system. To reverse the direction of rotation of the engine, the ignition and/or the fuel supply is first switched off, and upon a subsequent coasting of the engine, a targeted early ignition is set when a specific limiting rotational speed is undershot and after, if appropriate, the fuel supply has been resumed. Early ignition reverses the direction of rotation of the engine, and the fuel supply and ignition are subsequently controlled in accordance with the reversed direction of rotation. A single sensor interacts with an incremental transducer having a specific number of transducer segments distributed uniformly over a circumference to determine the instantaneous angular speed of the crank mechanism and the crank mechanism position.

12 Claims, 5 Drawing Sheets

U.S. PATENT DOCUMENTS

| | | | | |
|---|---|---|---|---|
| 6,119,666 | A * | 9/2000 | Fischer et al. .............. | 123/617 |
| 6,234,119 | B1 * | 5/2001 | Tsukada et al. ........... | 123/41 E |
| 6,357,398 | B1 * | 3/2002 | Arakawa et al. .......... | 123/41 E |
| 6,827,063 | B2 * | 12/2004 | Breitegger et al. .... | 123/406.58 |
| 2002/0026825 | A1 * | 3/2002 | Namari ........................ | 73/116 |

FOREIGN PATENT DOCUMENTS

| | | |
|---|---|---|
| DE | 196 11 289 A1 | 9/1997 |
| EP | 0 750 113 A2 | 12/1996 |

OTHER PUBLICATIONS

Ottomotor-Management 1998, Robert Bosch GmbH, p. 272, col. 2, Line 1 -p. 274, col. 2, line 22, Figs. 12, 13.

* cited by examiner

METHOD FOR REVERSING THE DIRECTION OF ROTATION OF A TWO-STROKE ENGINE

FIELD AND BACKGROUND OF THE INVENTION

The invention is concerned with a method for reversing the direction of rotation of a two-stroke engine whose rotational speed and crank mechanism position are sensed using a suitable sensor system, in which, in order to reverse the direction of rotation the ignition and/or the fuel supply is first switched off and when the engine subsequently coasts a targeted early ignition is set when a specific limiting rotation speed is undershot and after, if appropriate, the fuel supply has been resumed; which early ignition reverses the direction of rotation of the engine, and the ignition and fuel supply are subsequently controlled in accordance with the reversed direction of rotation.

Such a method for reversing the direction of rotation of a two-stroke engine while operating is already known. The determination of the direction of rotation which is necessary for the control process is carried out here with at least two Hall sensors, in which case it is possible not only to determine the rotational speed but also the direction of rotation and position of the crankshaft from the chronological sequence of the sensor signals. In addition to the increased costs for the second sensor, the costs for the mounting of a second sensor, which also has to be connected to a control logic, are also increased.

SUMMARY OF THE INVENTION

The object of the present invention is to provide a method for reversing the direction of rotation of a two-stroke engine which operates with only one sensor.

The object is achieved according to the invention by means of a method of the type described at the beginning in which a single sensor interacts with an incremental transducer with a specific number of transducer segments which are distributed uniformly over a circumference, and with a gap, and the instantaneous angular speed of the crank mechanism over the circumference is determined using the transducer segments and the gap is evaluated in order to determine the absolute crank mechanism position, in which method, when the engine coasts, the fluctuations in the angular speed of the crank mechanism which are caused by the compression and expansion phases of at least one combustion chamber of the engine are sensed during one rotation and are assigned to a specific transducer segment, and the direction of rotation is determined from the relative angular position of these transducer segments with respect to the gap.

DETAILED DESCRIPTION OF THE PREFERRED EMBODIMENT

Figure 5:
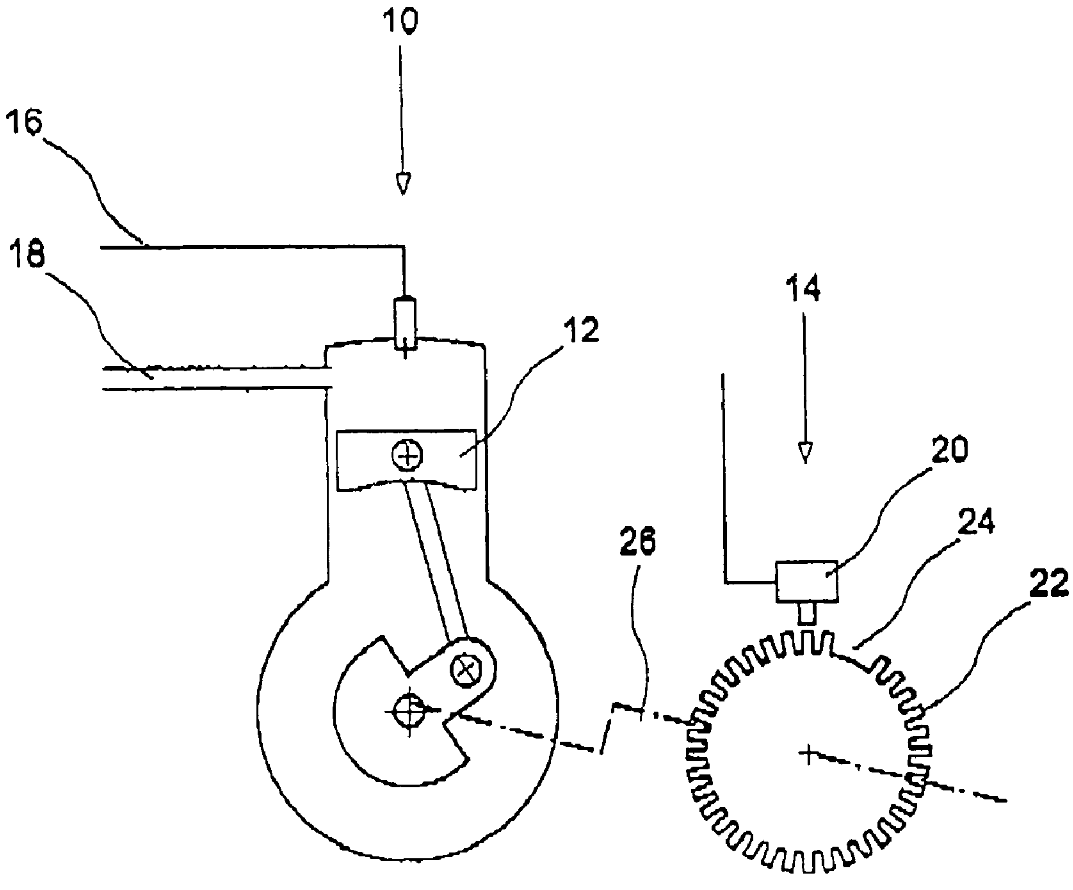
FIG. 5 is a mechanical diagram presenting components of an engine operated in the system of FIG. 1.

The method utilizes the fluctuations in the angular speed which occur in an engine 10 (FIG. 5) which is coasting without ignition and/or fuel supply and which result from the braking of the crank mechanism 12 during the compression phases and a slight re-acceleration during the expansion phases. It is possible to sense these fluctuations by using an incremental transducer 20 whose transducer segments 22 are provided with a specific angular spacing so that the precise angular speed can be determined repeatedly during one rotation from the chronological interval between the triggered signals over the circumference. During the coasting, there are, for example, local maximum values and minimum values in the angular speed which can be assigned to specific transducer segments 22, for example by counting the pulses since the gap of the incremental transducer 20 was last passed. As a result, in addition to the gap, further information is obtained about the angular position of the crank mechanism 12 the assigned transducer element being a different number of segments away from the gap depending on the direction of rotation of the engine 10. The type of the sensor 14 which is used is irrelevant here, it is possible to use both inductive sensors and Hall sensors which interact, for example, with teeth as transducer segments 22, or else it is also possible to use other sensors, for example optically acting sensors which interact with a perforated disk or the like as an incremental transducer, the gap being a closed hole in this case.

Figure 3:
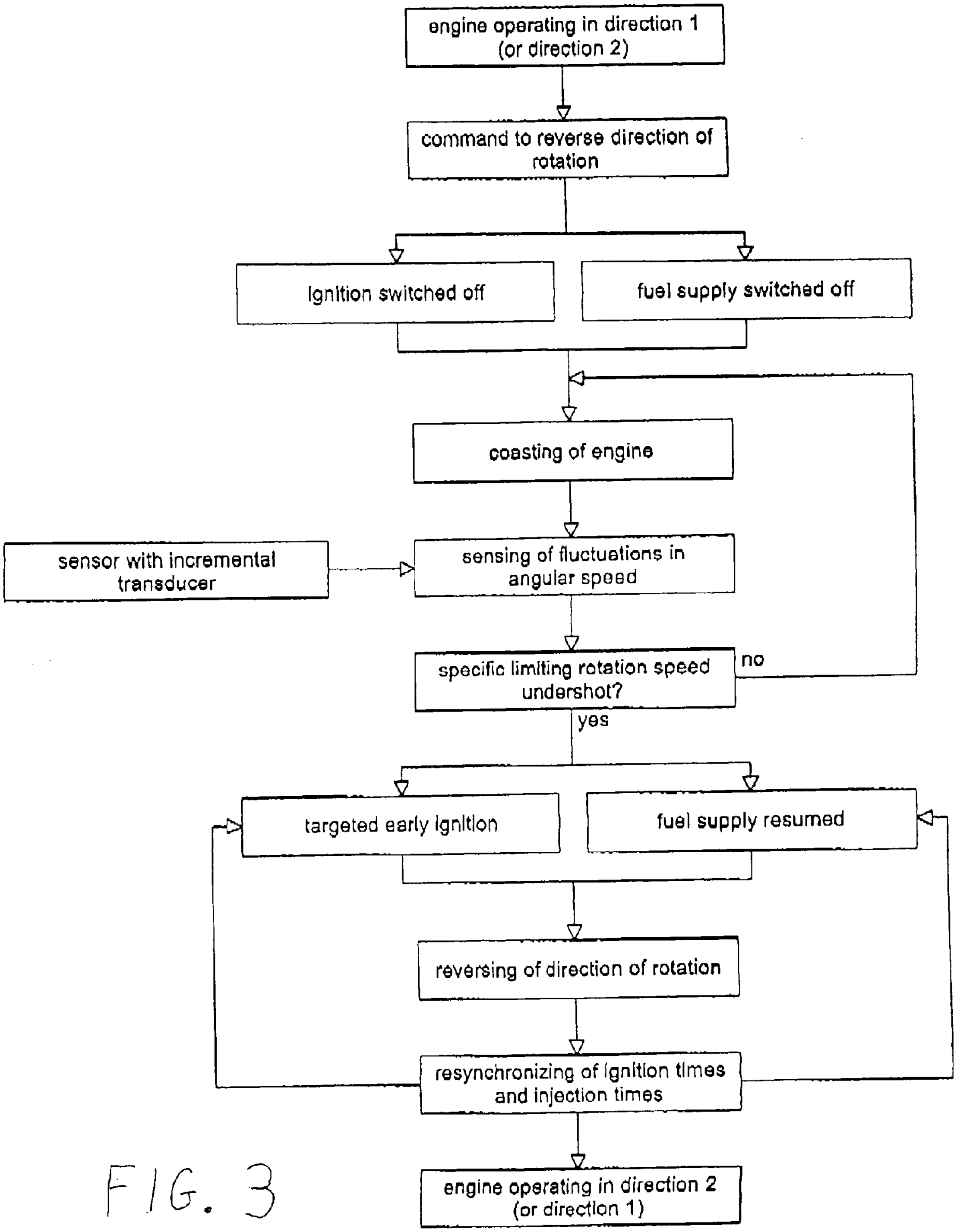
FIG. 3 shows the flow chart of FIG. 2 with a further feature of resynchronizing ignition and injection.
Figure 4:
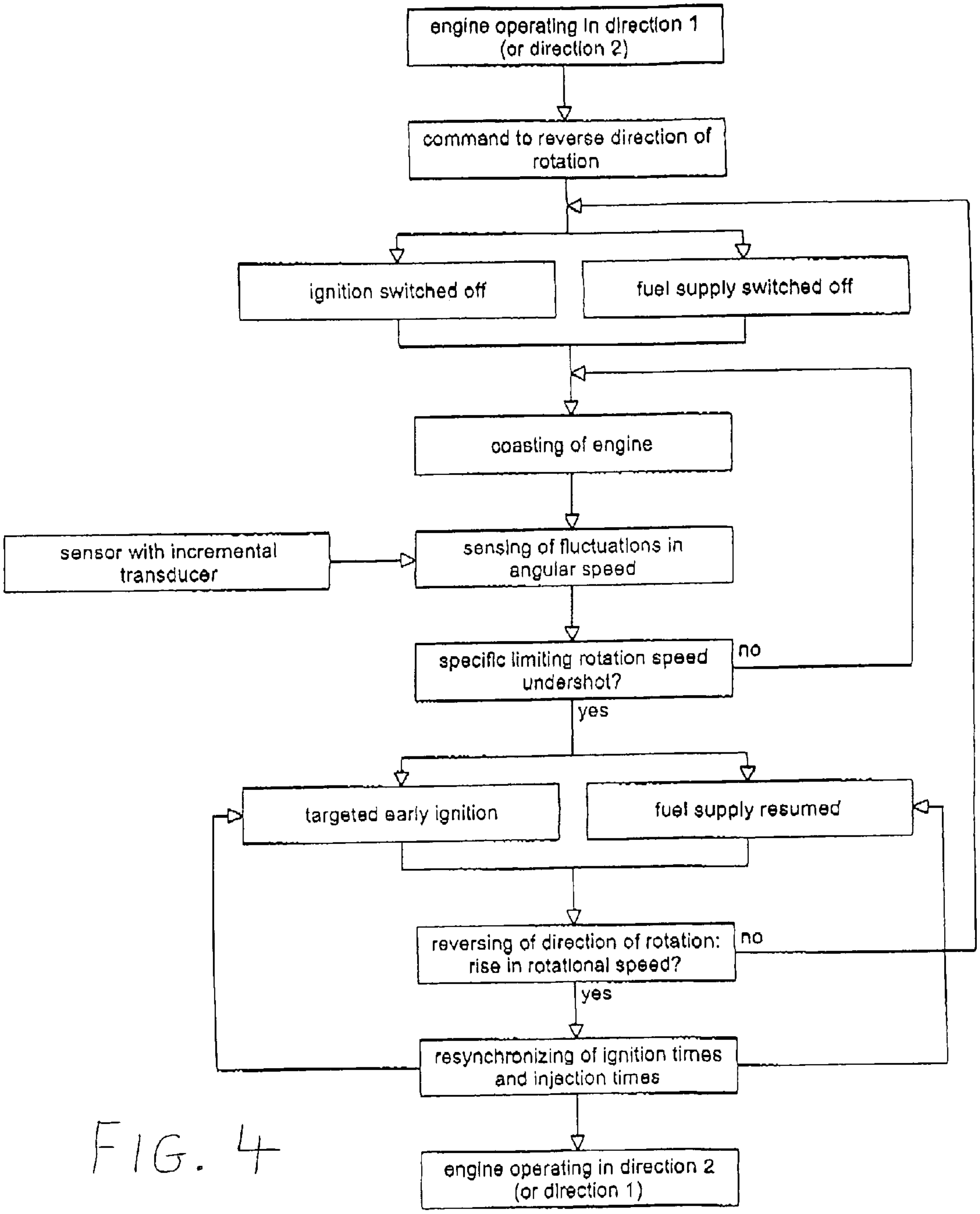
FIG. 4 shows a modification of the flow chart of FIG. 3.

After a reversal of the direction of rotation has taken place, the position of the ignition times and, if appropriate, injection times of the fuel supply 18 is preferably resynchronized (bottom of FIGS. 3, 4) with the gap 24 of the incremental transducer 20. This may he expedient in order to compensate positioning errors which may possibly occur during the reversal of the direction of rotation since the number of pulses which are triggered by the transducer segments 22 may fluctuate in the forward direction depending on the number of transducer segments still passed after the early ignition 16 owing to the mass inertia of the crank mechanism 12. As a rule, the synchronization can be already performed during the first rotation in the opposite direction.

Furthermore, the method can be developed in such a way that after the early ignition, a rise in the rotational speed of component 26 is anticipated after a number of sensor signals (sensor 14), the engine being switched off if said rise fails to occur. When the reversal of the direction of rotation is successful, the engine is already strongly accelerated during its first rotation in the new direction of rotation, which can be sensed by the sensor 14 using the incremental transducer 20. This rise in the rotational speed which fails to occur when the top dead center is incorrectly exceeded after the early ignition 16 in the previous direction of rotation can be used as a signal to switch off the engine in order to avoid the situation in which the engine 10 which is still running forward is affected by a completely incorrect ignition time during the subsequent rotation.

The method is particularly preferably used in a two-cylinder engine whose cylinders are arranged offset by 180° on the crank mechanism, the assignment, i.e. the actuation of the ignition 16 and, if appropriate of the fuel injection 18, being interchanged between the first and second cylinders. It would also be conceivable to change the actuation of the cylinders computationally, but the interchanging provides the particular advantage that in the reverse direction of rotation the gap 24 of the incremental transducer which is usually arranged approximately 90° before the top dead center of the first cylinder with respect to the forward direction of rotation is also at a relatively small angular distance with respect to the ignition process which is then actually taking place in the second cylinder, resulting in advantages for the actuation. In a single-cylinder engine, after the reversal of the direction of rotation it is of course necessary to set the ignition and, if appropriate, the fuel injection to a changed relationship with respect to the position of the gap of the incremental transducer. Under certain circumstances it would also be conceivable to provide a further gap which must not however make it more difficult to determine the position of the crank mechanism in the way previously described.

In multi-cylinder engines, it is possible, depending on the offset of the right-angled bends of the crankshaft 26 which are assigned to the cylinders to change the new assignment after the reversal of the direction of rotation by interchanging the cylinders in pairs or, for example in the case of a three-cylinder engine, the assignment is re-determined with respect to the gap 24 of the incremental transducer.

A further advantage of the incremental transducer 20 is used in one preferred development of the method according to which after the early ignition is output, the number of transducer segments of the incremental transducer which match the sensor is counted, and when a specific limiting number is exceeded the engine is switched off. This measure which is possible as an alternative or as a supplement to sensing the rise in the rotational speed can also be used for the evaluation to determine whether the reversal of the direction of the rotation of the engine was successful. The gap for the incremental transducer is, as already mentioned generally up to approximately 90° before the top dead center of the piston with respect to the forward direction of rotation. The early ignition is, for example, preferably approximately 50° before the top dead center, i.e. approximately 4 to 5 transducer segments after the gap of the incremental transducer. If the direction of rotation is successfully reversed, the sensor senses considerably fewer segments up to the time when the gap is reached again, even when there are overshoots owing to the mass inertia of the crank mechanism, than when the top dead center is passed with a subsequent 270° rotation of the incremental transducer. If the gap is sensed after a number of sensor pulses in a number approximately equal to a quarter of the overall number of transducer segments, it is possible to assume that a successful reversal of the direction of rotation has occurred.

Figure 1:
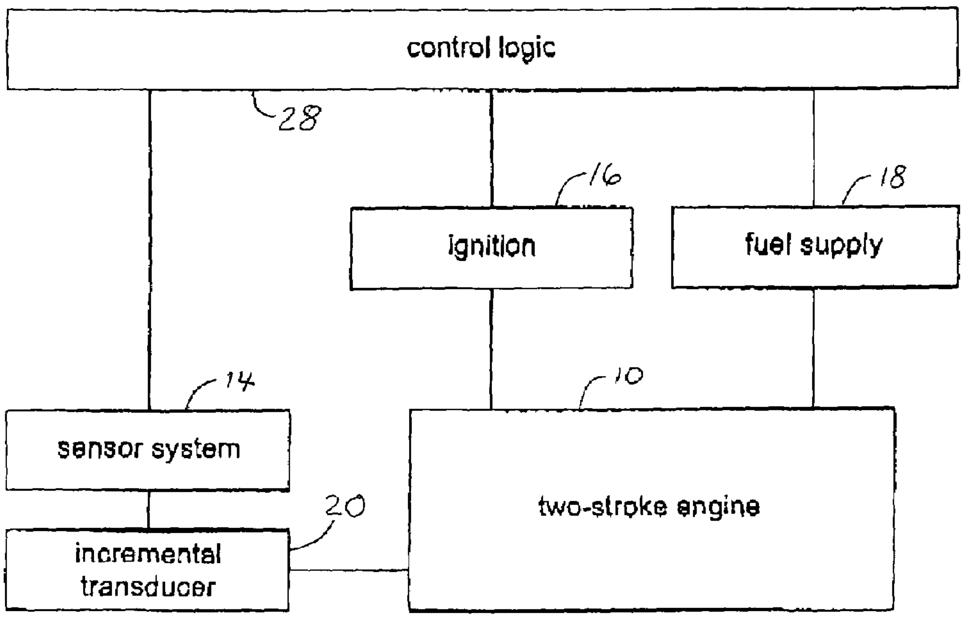
FIG. 1 shows, diagrammatically, a system for operation of an engine in accordance with the invention.
Figure 2:
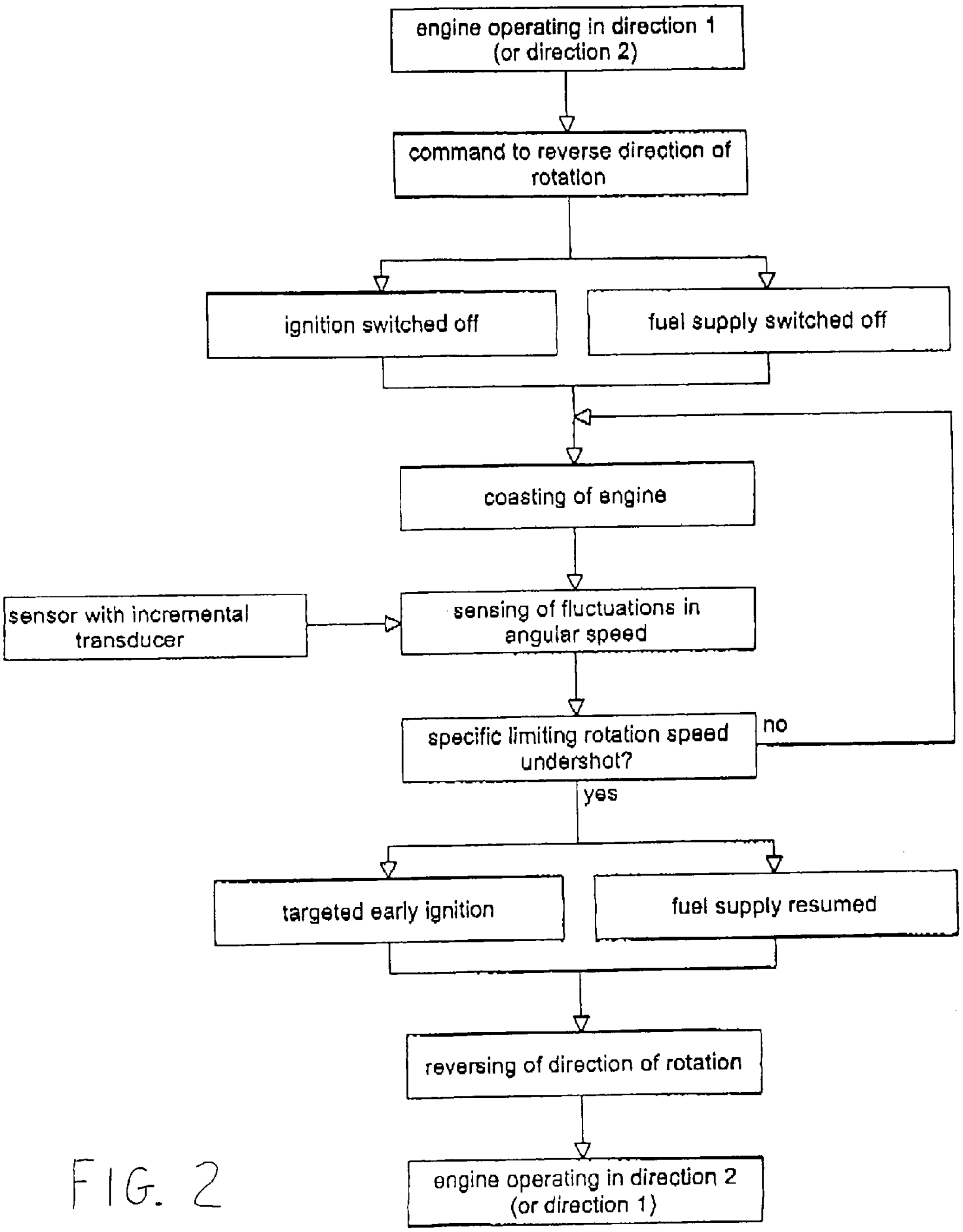
FIG. 2 is a flow chart of operation of the engine.

The subject-matter of the present invention is also a sensor system which permits positions to be sensed using an incremental transducer having transducer segments distributed uniformly over the circumference, and using a sensor. According to the invention, a control logic 28 (FIG. 1) senses cyclical fluctuations in the sensed angular speed during one rotation which are caused by the compression and expansion phases of the at least one combustion chamber when the engine coasts in a non-driven fashion, and generates information about the angular position of the crank mechanism by assignment of these fluctuations to specific transducer segments of the incremental transducer. It is possible to use such a sensor system, which is suitable for use in various areas, to determine the angular position of a crank mechanism. For the preferred use in a method of the type described above, the incremental transducer 20 preferably has a gap 24 which is preferably formed by shortening or cutting out two transducer segments which provide, in conjunction with the sensor, further information about the angular position of the crank mechanism. By means of the assignment of specific gradients of the angular speed to specific transducer segments and by means of the sensing of the gap in addition to the determining of the instantaneous rotational speed and of the determining of the crank mechanism position, such a sensor system also permits the direction of rotation to be determined precisely since the angular spacing between the transducer segment which is determined and the gap is different depending on the direction of rotation when the two-stroke engine coasts.

As already mentioned, the gap is preferably provided at 90° before the first or single cylinder of the engine, as viewed in the forward direction of rotation of the engine, in order, on the one hand, to permit appropriately timed triggering of the ignition pulses during normal running and, on the other hand, also to be able to trigger the early ignition, preferably approximately 50° before the top dead center, even when there is a desired reversal of the direction of rotation.

The incremental transducers which have been used hitherto in the field of vehicles generally have a division into 60 teeth over the circumference, the gap usually taking the place of two teeth for it to be able to be sensed with certainty. In contrast, the sensor system according to the invention preferably has only 36 transducer segments, preferably teeth, which are distributed over the circumference, two of which are omitted in order to form the gap. This number of transducer segments has proven advantageous with an arrangement on the crankshaft of a two-stroke engine since, given a customary number of 60 teeth, an excessively high interrupt load of the system results owing to the high repetition rate at high rotational speeds. The number of approximately 36 transducer segments has proven particularly advantageous here with respect, on the one hand, to reducing the interrupt loading of the system and, on the other hand, to achieving sufficient resolution over the circumference of the crank mechanism.

The invention claimed is:

1. A method for reversing the direction of rotation of a two-stroke engine whose rotational speed and crank mechanism position are sensed using a suitable sensor system, in which method, in order to reverse the direction of rotation of the engine, the ignition and/or the fuel supply is first switched off, and upon a subsequent coasting of the engine, a targeted early ignition is set when a specific limiting rotational speed is undershot and after, if appropriate, the fuel supply has been resumed; wherein early ignition reverses the direction of rotation of the engine, and the fuel supply and ignition are subsequently controlled in accordance with the reversed direction of rotation; wherein a single sensor interacts with an incremental transducer having a specific number of transducer segments distributed uniformly over a circumference, and the incremental transducer has a gap; and the instantaneous angular speed of the crank mechanism over the circumference is determined using the transducer segments and the gap in order to determine the crank mechanism position; in which method, when the engine coasts, fluctuations in the angular speed of the crank mechanism, which fluctuations are caused by compression and expansion phases of at least one combustion chamber of the engine, are sensed during one rotation of the engine and are assigned to a specific transducer segment, and the direction of rotation of the engine is determined from the relative angular position of this transducer segment with respect to the gap.

2. The method as claimed in claim 1, wherein, after a reversal of the direction of rotation, the position of the ignition times and, if appropriate, injection times are resynchronized with the gap of the incremental transducer.

3. The method as claimed in claim 1, wherein, after the reversal of the direction of rotation, a rise in the rotational speed is anticipated after a number of sensor signals, the engine being switched off if said rise fails to occur.

4. The method as claimed in claim 1, wherein the engine is a two-cylinder engine with cylinders which are offset 180° on the crank mechanism, and an assignment between the first and second cylinders is interchanged after a reversal of the direction of rotation.

5. The method as claimed in claim 1, wherein, in an engine with more than two cylinders, an assignment between cylinders which are arranged offset with respect to one another by 180° on the crank mechanism is interchanged in pairs, or when the offset of the cylinders deviates, the assignment is predetermined in accordance with the offset with respect to the gap.

6. The method as claimed in claim 1, wherein, in a single-cylinder engine, in accordance with the position of the gap, an assignment in accordance with the position of the gap, with respect to the upper dead center of the piston, is delayed by control means after the reversal of the direction of rotation.

7. The method as claimed in claim 1, wherein, after the early ignition is output, the number of transducer segments of the incremental transducer which match the sensor is counted, and when a specific limiting number is exceeded the engine is switched off.

8. A sensor system, comprising: a sensor, a control logic, and an incremental transducer having transducer segments on a rotating component of a two-stroke engine, which transducer segments are distributed uniformly over the circumference; wherein the incremental transducer has a gap which provides information about an angular position of a crank mechanism of the engine, and the control logic determines, by use of the transducer segments, the instantaneous angular speed of the crank mechanism over the circumference, and senses, by use of the incremental transducer, cyclical fluctuations in the angular speed during one rotation of the engine, which fluctuations are caused by compression and expansion phases of at least one combustion chamber of the engine when the engine coasts; and wherein the control logic generates information about the angular position of the crank mechanism by assignment to specific transducer segments of the incremental transducer, and determines the direction of rotation of the engine by counting, between the gap and the computationally determined crank mechanism position, control signals which are triggered by the transducer segments.

9. The sensor system as claimed in claim 8, wherein the gap is provided 90° before the first or single piston of the engine, viewed in a forward running direction of the engine.

10. The sensor system as claimed, in claim 8, wherein the incremental transducer is composed of 36 transducer segments, two of which are shortened or cut away to form the gap.

11. The sensor system as claimed in claim 8, wherein the sensor is an inductive sensor.

12. The sensor system as claimed claim 8, wherein the sensor is a Hall sensor.

* * * * *